(12) United States Patent
deJesus et al.

(10) Patent No.: US 7,914,858 B1
(45) Date of Patent: Mar. 29, 2011

(54) PROCESS TO SEAL HOUSING COMPONENTS TO CONTAIN LOW DENSITY GAS

(75) Inventors: Charles deJesus, Wayland, MA (US); Thomas G. Andrikowich, Whitinsville, MA (US); Michael C. Strzepa, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 1873 days.

(21) Appl. No.: 10/839,608

(22) Filed: May 4, 2004

(51) Int. Cl.
*B05D 7/00* (2006.01)
*B05D 1/36* (2006.01)

(52) U.S. Cl. ........ 427/585; 427/294; 427/295; 427/318; 427/386; 427/388.1; 427/407.1; 427/410

(58) Field of Classification Search .................. 427/585, 427/230–240, 294–296, 318, 355, 356, 372.2, 427/386, 388.1, 402, 407.1, 409, 410
See application file for complete search history.

(56) References Cited

U.S. PATENT DOCUMENTS

| | | | |
|---|---|---|---|
| 4,147,821 A * | 4/1979 | Young | 427/295 |
| 5,282,100 A | 1/1994 | Tacklind et al. | 360/97.02 |
| 5,454,157 A | 10/1995 | Ananth et al. | 29/603 |
| 5,666,243 A | 9/1997 | Brent | 360/106 |
| 5,784,296 A | 7/1998 | Baker et al. | 364/551.01 |
| 6,144,178 A | 11/2000 | Hirono et al. | |
| 6,178,059 B1 | 1/2001 | Frees | 360/75 |
| 6,222,375 B1 | 4/2001 | Fitzpatrick et al. | 324/601 |
| 6,317,286 B1 | 11/2001 | Murphy et al. | |
| 6,392,838 B1 | 5/2002 | Hearn et al. | 360/97.02 |
| 6,496,362 B2 | 12/2002 | Osterhout et al. | |
| 6,567,235 B2 | 5/2003 | Kasetty et al. | 360/97.01 |
| 6,618,221 B2 | 9/2003 | Gillis et al. | |
| 6,631,053 B1 | 10/2003 | Chew | 360/265.7 |
| 6,644,362 B2 | 11/2003 | Bernett | |
| 6,646,821 B2 | 11/2003 | Bernett | |
| 6,678,102 B1 | 1/2004 | Liikanen et al. | 360/31 |
| 6,683,747 B2 | 1/2004 | Bernett | |
| 6,762,909 B2 | 7/2004 | Albrecht et al. | |
| 6,785,082 B2 | 8/2004 | Fiorvanti et al. | |
| 6,785,089 B2 | 8/2004 | Bernett | |
| 6,876,515 B2 | 4/2005 | Unno | |
| 6,898,043 B2 | 5/2005 | Fioravanti | |
| 6,914,742 B1 | 7/2005 | Fioravanti et al. | |
| 6,930,858 B2 | 8/2005 | Gunderson et al. | |
| 6,970,322 B2 | 11/2005 | Bernett | |
| 6,989,493 B2 | 1/2006 | Hipwell, Jr. et al. | |
| 6,999,262 B2 | 2/2006 | Han et al. | |
| 2002/0066726 A1 * | 6/2002 | Cole et al. | 219/444.1 |
| 2003/0007280 A1 | 1/2003 | Bernett et al. | 360/77.02 |
| 2003/0026033 A1 | 2/2003 | Fioravanti et al. | 360/75 |
| 2003/0081349 A1 | 5/2003 | Bernett | 360/97.02 |
| 2003/0089417 A1 | 5/2003 | Bernett | 141/65 |
| 2003/0090832 A1 | 5/2003 | Bernett et al. | 360/97.02 |
| 2003/0172520 A1 | 9/2003 | Liu et al. | |
| 2003/0179489 A1 | 9/2003 | Bernett et al. | 360/97.01 |
| 2003/0202276 A1 | 10/2003 | Smith | 360/97.02 |
| 2004/0216514 A1 | 11/2004 | Nunnally et al. | |
| 2005/0068666 A1 | 3/2005 | Albrecht et al. | |
| 2005/0173870 A1 | 8/2005 | Gunderson | |
| 2005/0184463 A1 | 8/2005 | Boutaghou et al. | |
| 2006/0002067 A1 | 1/2006 | Gunderson et al. | |
| 2006/0044666 A1 | 3/2006 | Fukushima | |
| 2006/0044675 A1 | 3/2006 | Fukushima et al. | |
| 2006/0072241 A1 | 4/2006 | Feliss et al. | |
| 2006/0072244 A1 | 4/2006 | Rapp | |

FOREIGN PATENT DOCUMENTS

| | | |
|---|---|---|
| WO | WO 2004/010419 A1 | 1/2004 |
| WO | WO 2004/010431 A1 | 1/2004 |

OTHER PUBLICATIONS

U.S Appl. No. 10/055,237, filed Oct. 24, 2001, Marshall et al.
U.S. Appl. No. 10/266,436, filed Oct. 8, 2002.
U.S. Appl. No. 10/848,476, filed May 17, 2004, Burns et al.
U.S. Appl. No. 10/839,611, filed May 4, 2004, Gifford et al.
U.S. Appl. No. 10/839,548, filed May 4, 2004, Andrikowich et al.
U.S. Appl. No. 10/839,606, filed May 4, 2004, Adrikowich et al.
U.S. Appl. No. 10/839,685, filed May 4, 2004, Andrikowich et al.
U.S. Appl. No. 10/860,626, filed Jun. 2, 2004, Mann et al.
IBM Corp., "Seal for a Hermetically Sealed Disk File," IBM Technical Disclosure Bulletin, vol. 27, No. 11 (Apr. 1985).

* cited by examiner

*Primary Examiner* — William Phillip Fletcher, III
(74) *Attorney, Agent, or Firm* — Fellers, Snider, et al.

(57) ABSTRACT

A method and apparatus for sealing disk drive housing castings and the resulting housings. A housing component of a data storage device is placed in an environment of decreased pressure where a first tank that is an autoclave is pressurized at a selected pressure and the environment is a first tank that encloses the housing component. A second tank that is an autoclave is pressurized at substantially the same pressure as the first tank while the second tank is fluidically coupled to the first tank and encloses a sealant. The sealant is applied to a surface of the component when it is under decreased pressure by transferring the sealant from the first tank to the second tank. A pressure of at least one atmosphere is further applied so that a portion of the sealant contactingly permeates voids in the housing component before the sealant is subsequently cured.

22 Claims, 8 Drawing Sheets

PROCESS TO SEAL HOUSING COMPONENTS TO CONTAIN LOW DENSITY GAS

FIELD OF THE INVENTION

The present invention relates to inert gas-filled disk drives, and more particularly to methods of sealing aluminum die-castings and the resulting sealed components, such as base plates and covers, to maintain in internal inert gas environment and simultaneously meet stringent cleanliness standards.

BACKGROUND OF THE INVENTION

Hard disk drives incorporate magnetic storage disks and read/write heads which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk or, in some instances, in contact with the surface of the storage disk. The actuator assembly is typically positioned by a voice coil motor which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely effected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals used in disk drives between the housing components, such as the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows the tracks to be spaced more closely together.

Despite these advantages, low density gas-filled drives have not been commercially successful. Low density gas-filled drives, in order to function, must be effectively sealed over an acceptable lifetime of the drive. It has been difficult to prevent the low density gas from escaping from the sealed drive environment. Unlike air-filled drives, a port may not be used to equalize pressure outside and inside the drive. As a result, the seal between the cover and base plate must minimize or prevent leakage and maintain a threshold level of low density gas within the sealed environment over the expected lifetime of the drive. Conventional rubber seals used in air-filled drives are inadequate at preventing leakage of low density gas due to the smaller atom size of low density gases, such as helium, compared to air. The smaller helium atoms diffuse through the rubber seals, thereby reducing the volume of low density gas within the drive. Thus, over time, the necessary threshold quantity of low density gas may be lost within the drive environment and may or may not be replaced with ambient air. In either case, the performance of the drive will change from the design specifications, namely, a low density gas-filled sealed environment. As the low density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low density gas within the drive is a draw back to low density gas-filled drives. Indeed, data stored within the drive may be irretrievably lost if the drive fails due to the loss of the low density gas environment.

The die casting process, as well as other methods of manufacturing housing components, often results in the components having a porosity (small pock mark-like craters or pits) at the surface and within the body of the component (small voids in the grain structures of the material). This porosity can inhibit or prevent an adequate seal between two components when on abutting surfaces of the components and, similarly, can prevent an adequate seal through openings in a component, such as an opening in a base plate for a spindle motor, when the act of forming the opening exposes air pockets in the body of the component. Porosity within the body of the components can also allow low-density gas to permeate through the enclosing walls. Porosity of these kinds must be accounted for when making a low-density gas filled disk drive.

SUMMARY OF THE INVENTION

Various embodiments of the present invention are generally directed to a method of making a housing for a storage device that will enclose an environment of inert gas. In accordance with some embodiments, the method generally comprises placing a housing component in an environment of decreased pressure, applying a sealant to the surface of the component when it is under decreased pressure, applying a pressure of at least one atmosphere, and curing the sealant.

DETAILED DESCRIPTION OF THE PREFERRED EMBODIMENT OF THE INVENTION

Figures 1, 5:
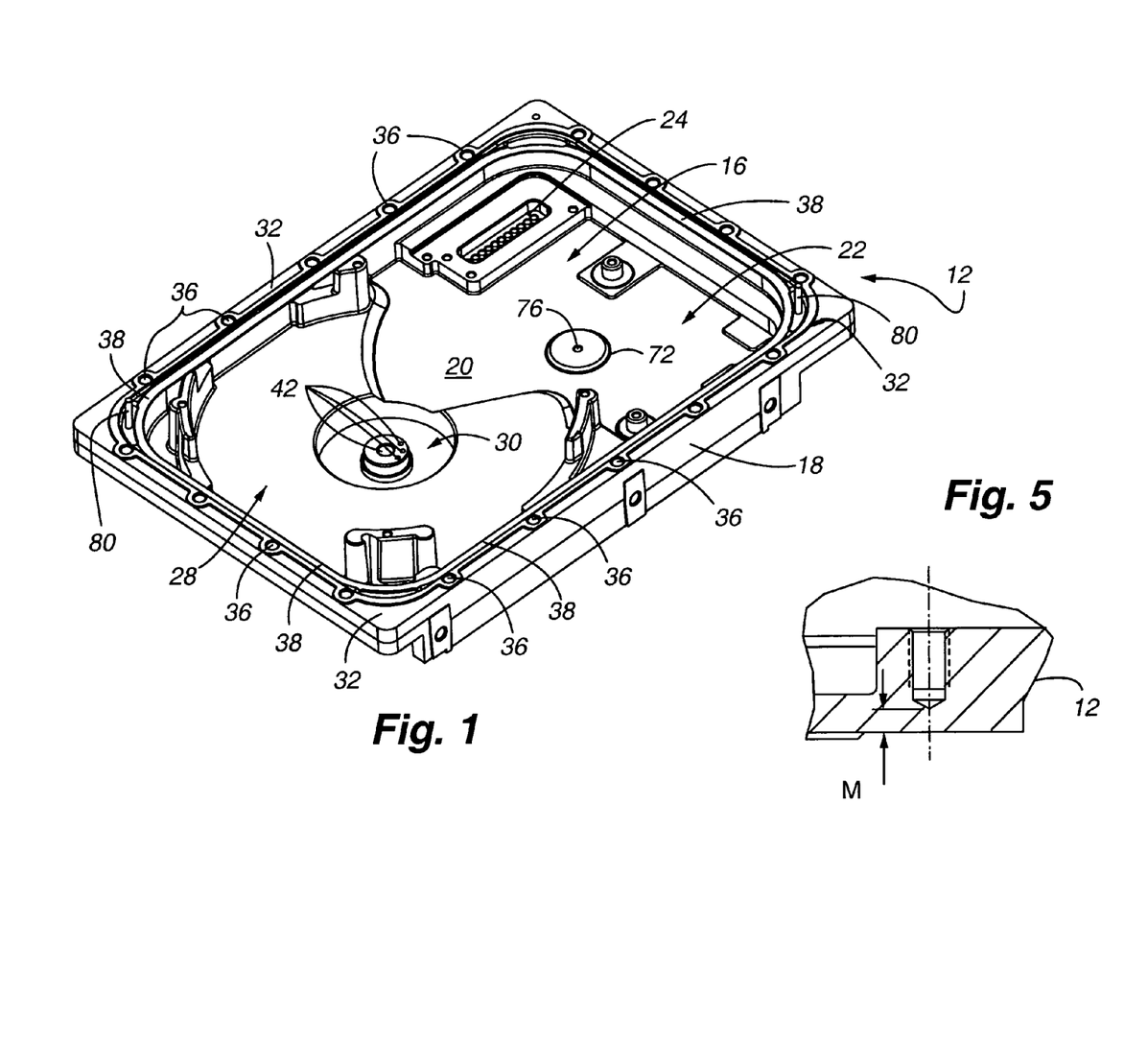
FIG. 1 is a perspective view of a base plate for a hard disk drive.
FIG. 5 is a cross-section of a portion of a base plate.
Figure 2:
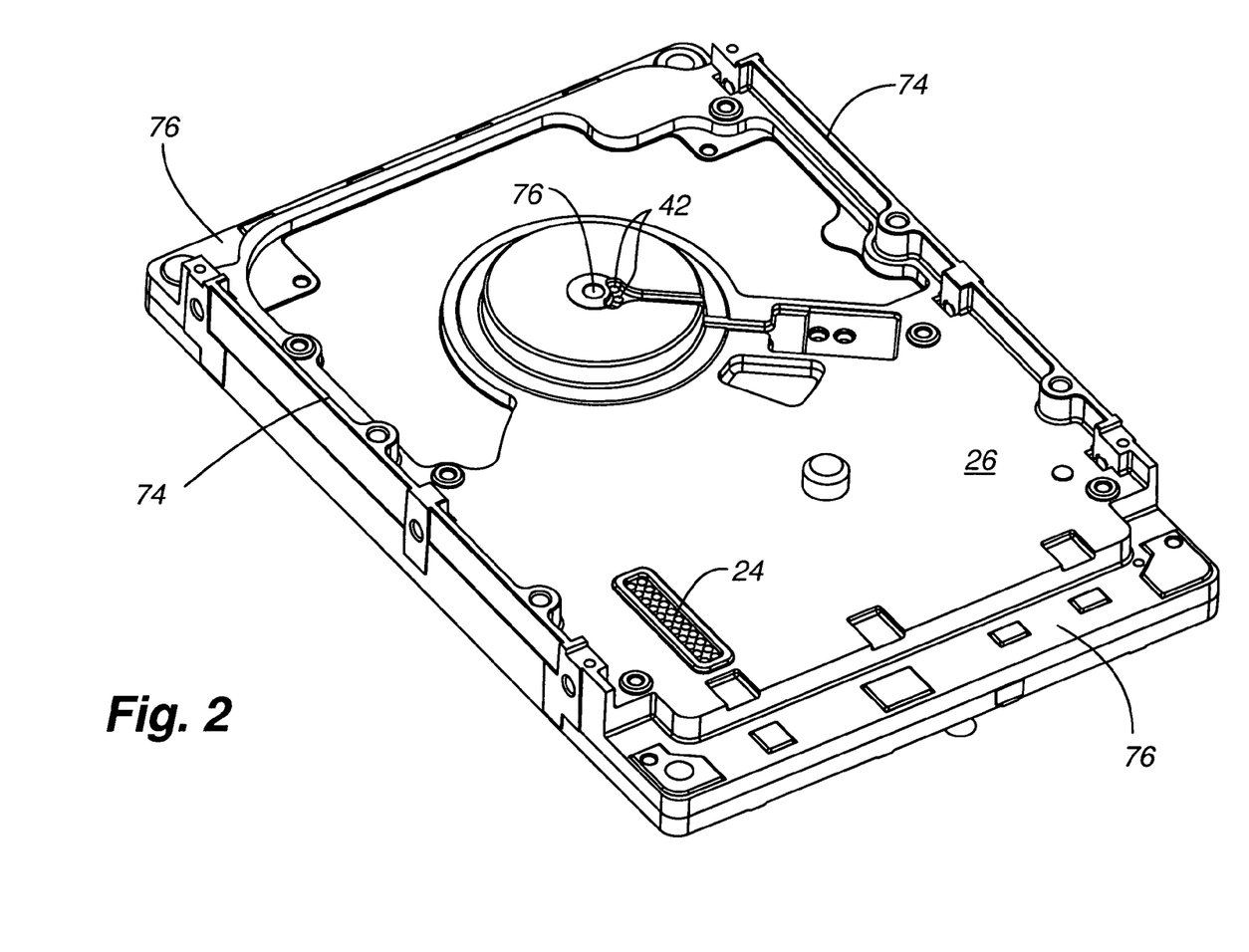
FIG. 2 is a perspective view of the opposite side of the base plate shown in FIG. 1.
Figure 3:
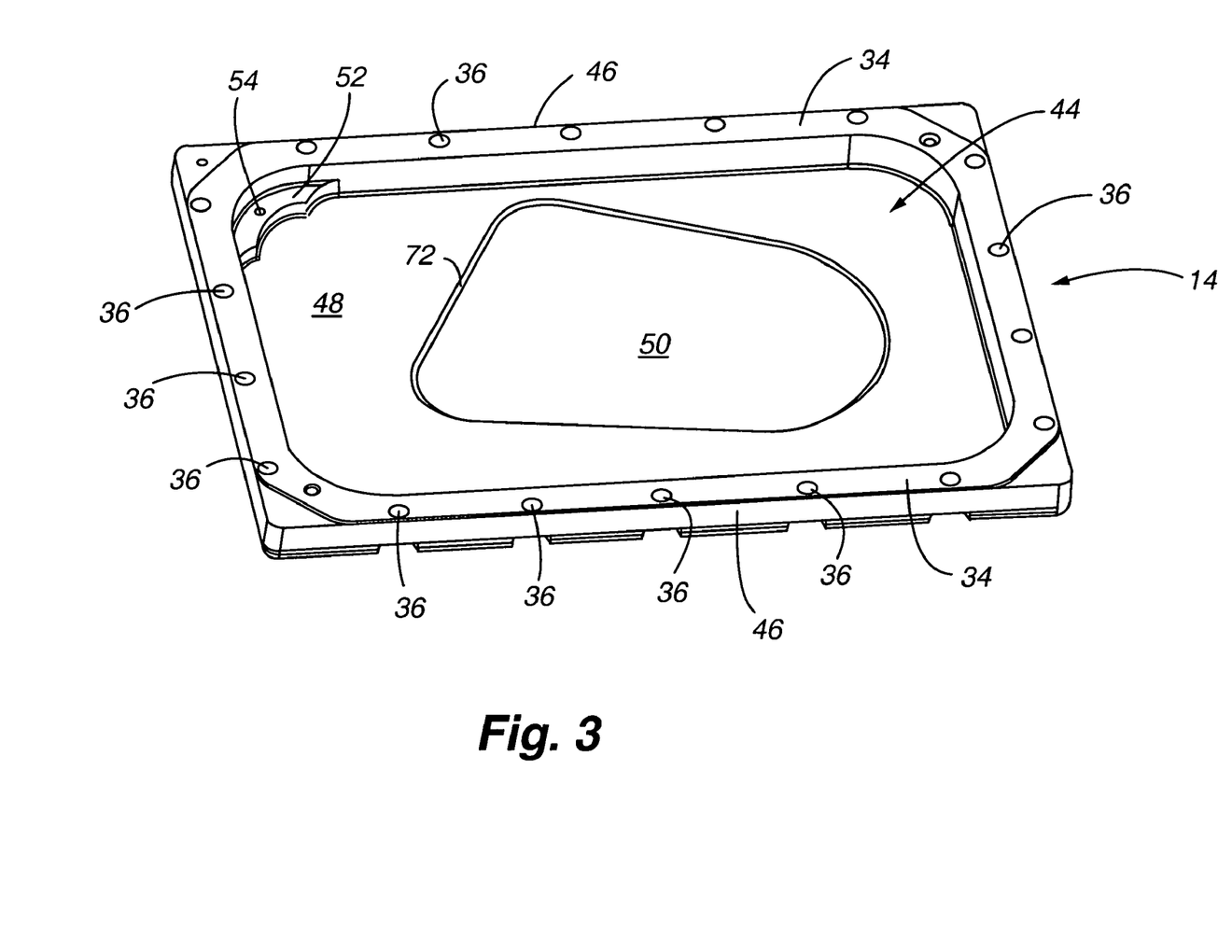
FIG. 3 is a perspective view of a cover for a disk drive.

A conventional hard disk drive housing is comprised of a base plate 12 and cover 14 as shown in FIGS. 1-4. The base plate generally includes an inner chamber 16 defined by a perimeter wall 18 and an inside bottom surface 20. The inside bottom surface 20 has a first portion 22 generally defining where the actuator assembly (not shown) is mounted. An opening 24 is formed in the first portion to accommodate a multi-pin connector (not shown) for interconnecting the actuator assembly and read/write heads to the printed circuit board (not shown) mounted to the outside bottom surface 26 of the base plate (FIG. 2). A second portion 28 of the inside bottom surface defines where the disk stack is mounted. In the illustrated embodiment, the second portion is elevated compared to the first portion and further includes a central recess 30 to accommodate a spin motor (not shown). The perimeter wall 18 includes a generally planar upper surface 32 which abuts a complementary surface 34 of the cover (FIG. 3). A plurality of aligned apertures 36 in the base plate and cover receive fasteners (not shown) to attach the cover to the base plate. The apertures in the base plate are typically threaded, as are the fasteners. The inside edge of the upper planar surface 32 forms a recess or shoulder 38. In a low density gas-filled drive, a metal seal (not shown), such as a C-shaped seal, is positioned in the recess 38 to form a uniform seal between the cover and base plate. The base plate may also include openings or apertures 42 to accommodate electrical connections between the spin motor and printed circuit board.

Figure 4:
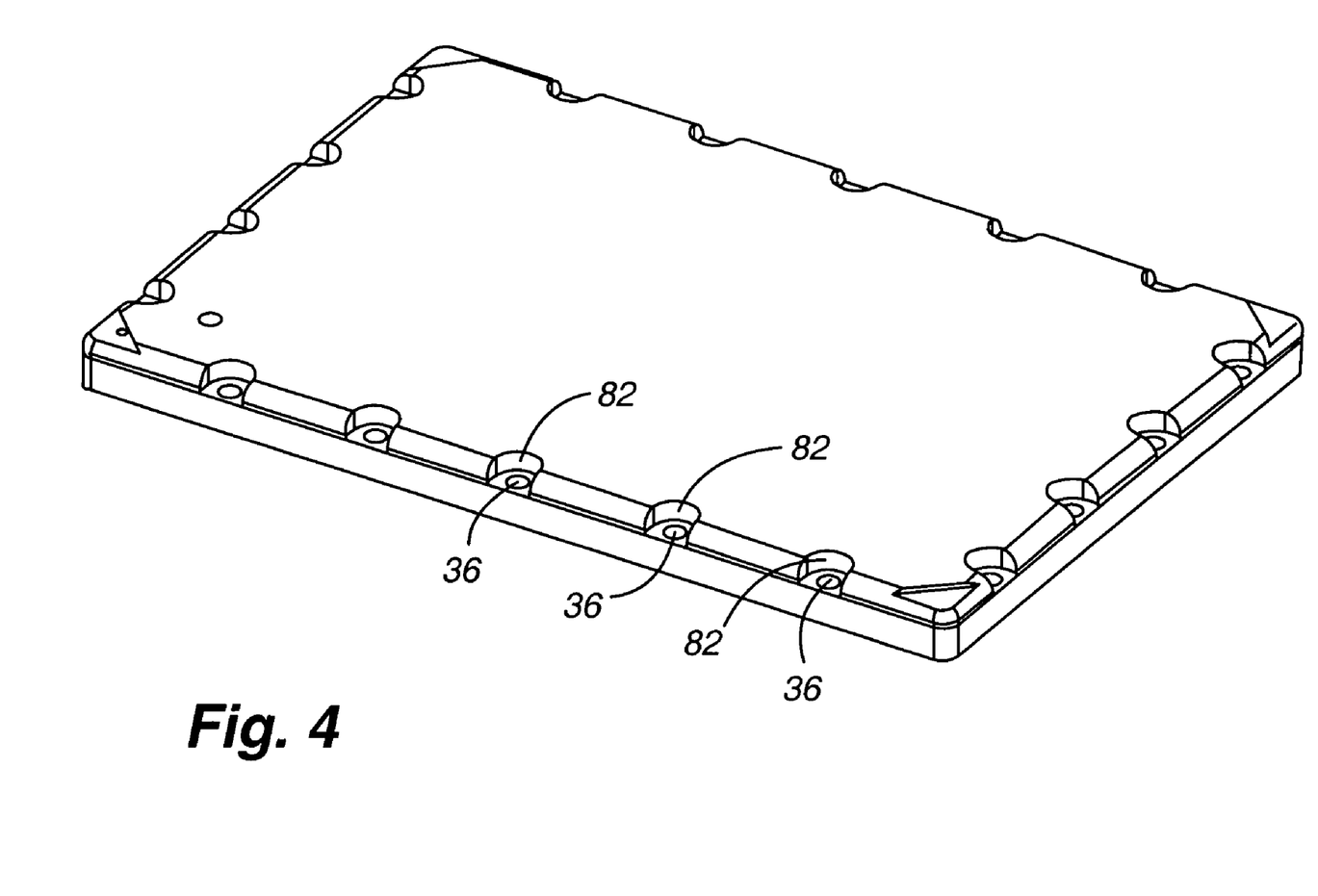
FIG. 4 is a perspective view of the opposite side of the cover shown in FIG. 3.

The cover 14 also includes an inner chamber 44 defined by the perimeter wall 46. The inside bottom surface 48 may include one or more additional recesses 50 to accommodate the components mounted to the base plate such as the actuator assembly and disk stack. In addition, the cover may include a thickened portion 52 inside of the perimeter wall for purposes of locating an aperture 54 extending through the cover. Once the drive components are fully assembled within the base plate and the cover is attached to the base plate, the aperture 54 may be used as a port to fill the drive with low density gas. It should be appreciated that this aperture may be formed at other locations on the cover or base plate.

Figure 6:
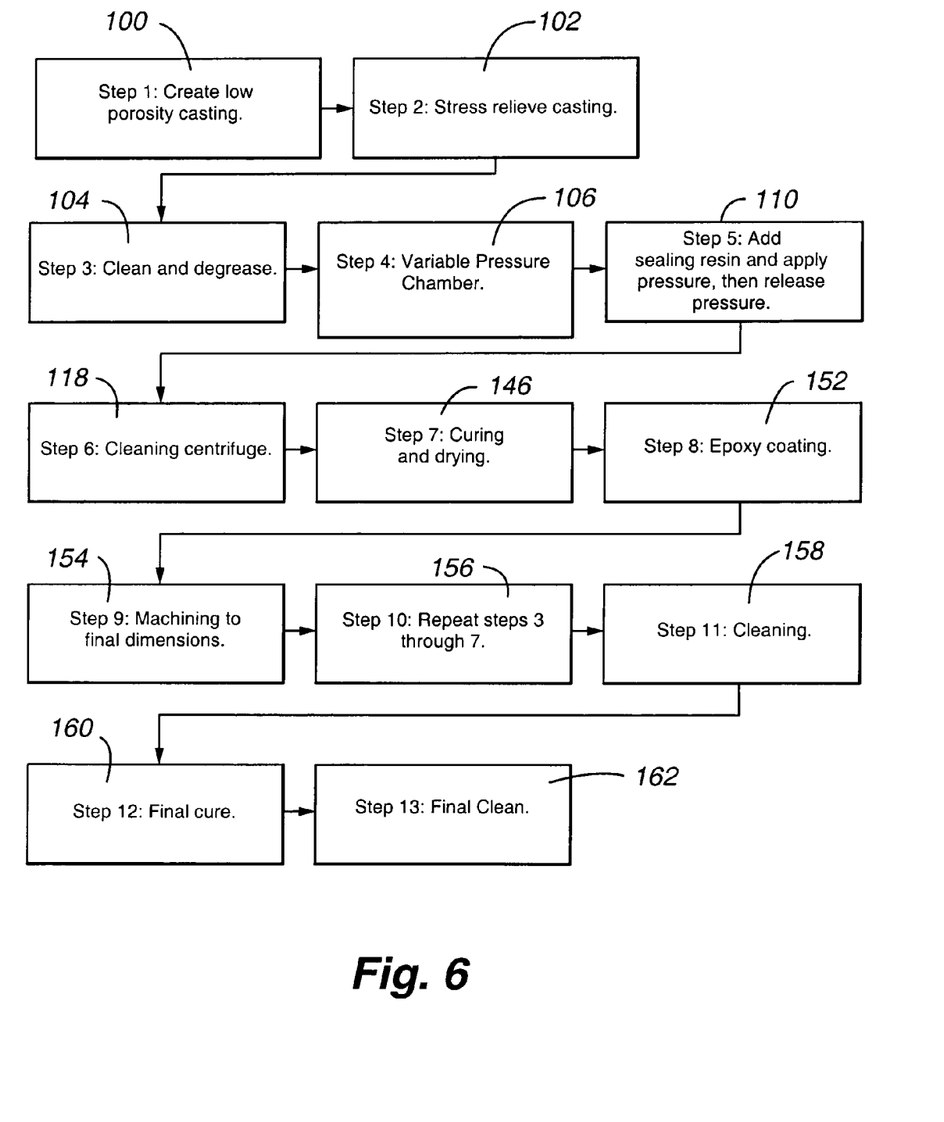
FIG. 6 is a flow chart of one embodiment of the sealing process of the present invention.

Turning to FIG. 6, a flow chart generally describing the preferred method of impregnating disk drive housing components according to one embodiment of the present invention is shown. The process applies to base plates and cover plates made by a casting process. The casting process results in components having voids or porous grain structure in the material. The size of the pores will vary depending upon the casting process. The size of the pores may be referred to as the porosity of the material. Exemplary embodiments of a base plate and cover are shown in FIGS. 1-4. Additionally, the preferred embodiment is described in association with aluminum casting components. It should be appreciated that the process would work with components made from other materials such as steel, zinc and magnesium.

As a threshold step, it is preferable that the disk drive housing components be created from a process which minimizes porosity within the components. For example, base plates and covers are typically made by a casting process using aluminum. Castings which meet the American Society of Testing and Methods (ASTM) E505, Category A, provide suitable low porosity components. Such castings have porosity in external part surfaces which does not exceed 0.127 millimeters in diameter. Internal pores may be larger. This step of the process is shown as item 100 in FIG. 6. A desired level of porosity which does not exceed 0.127 millimeters in diameter may be achieved using chill block cooling or vacuum-assist methodology for die casting for type A380 or 383 aluminum.

Following creation of low porosity components, in the second step of the process the castings are subject to stress relief. This is shown as item 102 in FIG. 6. Stress relief is achieved by heating the components. One exemplary process would subject the components to a temperature of 232° C. for four hours.

Figure 7:
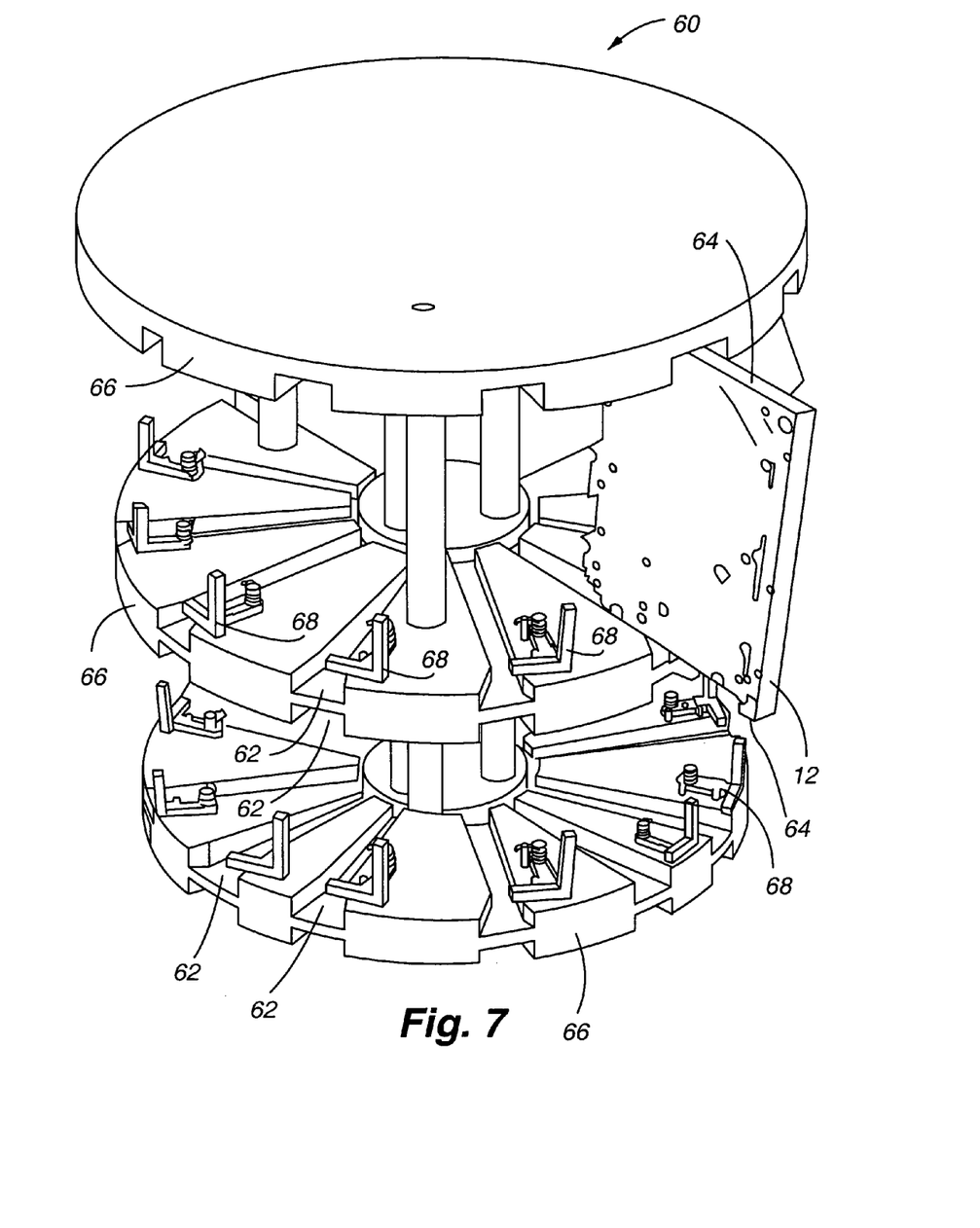
FIG. 7 is a perspective view of a component carrier used in the process of the present invention.

Following stress relief, in one embodiment, the castings are radially aligned in a fixture 60, shown in FIG. 7. The fixture includes a series of radial grooves 62 dimensioned to receive the lateral edges 64 of a base plate 12 or cover 14 in order to vertically align the components in the fixture. The grooves are formed in horizontally aligned plates or trays 66. The trays combine to hold one or more layers of components. In the preferred embodiment, the fixture has three trays forming two layers of components. It should be further appreciated that the trays may be configured to align the components in other ways, provided the alignment does not hamper the processing. Retention members 68, such as spring locks, may be included to hold the component castings within the fixture. The fixture is then placed in a metal basket of similar cylindrical dimensions (not shown) for ease in handling, transportation and processing.

At number 104 in FIG. 6, the castings are subjected to a cleaning and degreasing process. The cleaning and degreasing process generally comprises a multi-step process where the components are subject to detergent wash and rinse cycles. The objective is to remove silicon and organics from the components.

Figure 9:
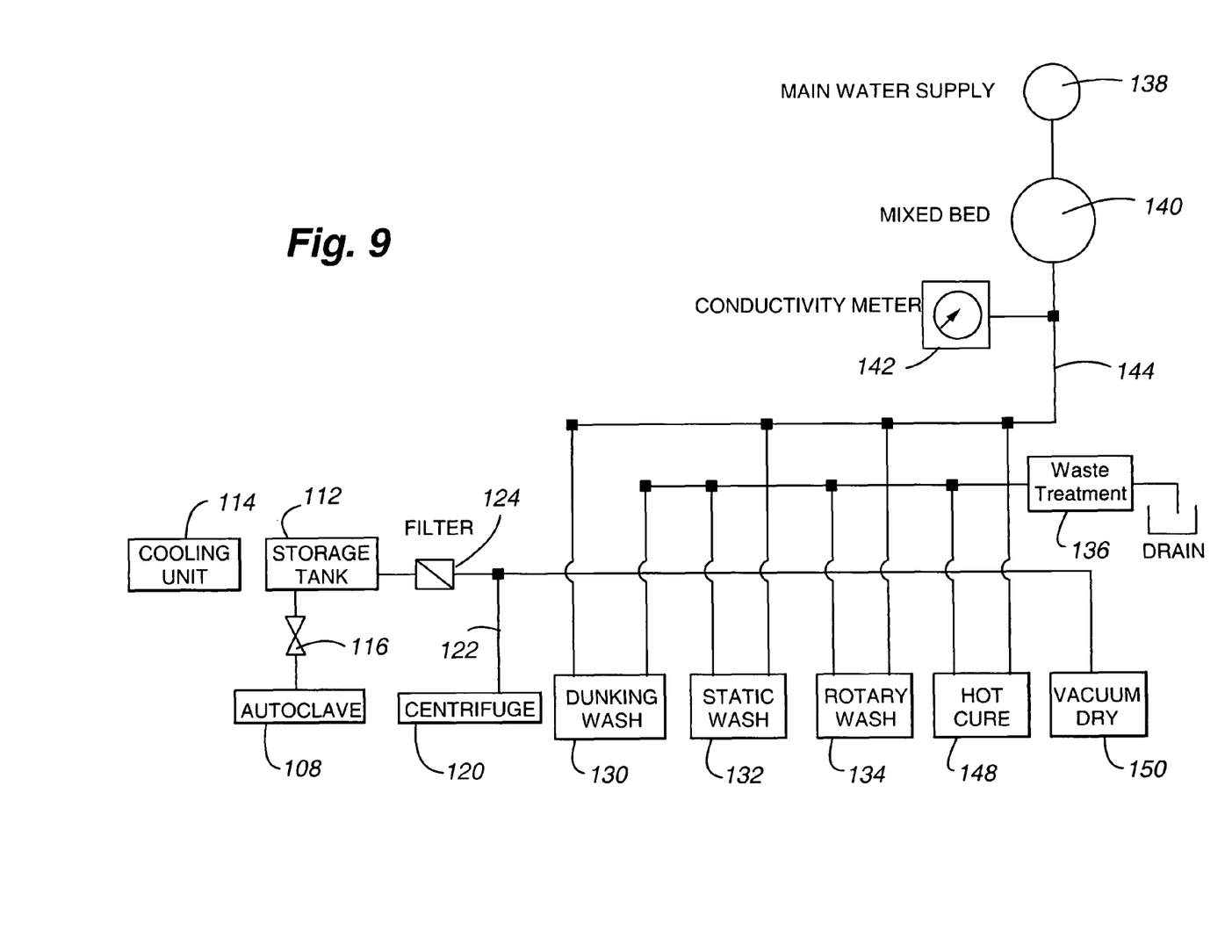
FIG. 9 is a schematic diagram of one embodiment of the process of the present invention.

At number 106 in FIG. 6, one or more baskets of castings are placed in a variable pressure chamber 108 (FIG. 9), such as an autoclave. With reference to FIG. 9, in the preferred embodiment, a vacuum is created in the autoclave placing the internal absolute pressure to between 3 to 8 millibars. This removes air from the chamber, including air within the exposed voids on the surface of the component castings. At number 110 in FIG. 6, a sealant, such as a methacrylate sealing resin, and a catalyst, such as mikrofine AZDN, are then transferred into the autoclave from a storage tank 112 (FIG. 9) to a level in which the castings are submersed within the sealant. In the preferred embodiment, the catalyst and sealant are maintained in the storage tanks at a temperature of between 15 and 20° C. by a cooling unit 114. Due to the nature of these chemicals, the lower temperature prevents the sealant from gelling or solidifying. In the preferred embodiment the sealer will solidify starting at temperatures greater than 35° C. A sensor (not shown) may be included to stop the inflow of sealant into the autoclave once the components are submersed. A valve 116 is positioned on the supply line between the storage tank and autoclave to control the flow of sealant and catalyst.

In the preferred embodiment, the submersed castings are maintained at the vacuum pressure for approximately ten minutes to twenty minutes. A valve on the autoclave (not shown) is then opened to allow the chamber to return to atmospheric pressure. Within a few seconds of opening the valve, the change in pressure forces sealant into the exposed pores of the casting. The condition is maintained for an optimum time period. In one embodiment, the optimum time period is approximately two minutes. The sealant and catalyst solution are then returned to its storage tank and the basket containing the castings is removed from the autoclave.

In the next step, 118 in FIG. 6, the baskets containing the castings are then placed in a centrifuge 120 (FIG. 9). In the preferred embodiment, the baskets are rotated in a clockwise direction for two minutes and then in a counterclockwise direction for two minutes. The purpose is to remove excess sealer and catalyst solution. The excess sealer and catalyst solution may be returned to the sealer storage tank 112 via return line 122 (FIG. 9). Optionally, a filter 124 may be placed on the return line to filter the sealant and catalyst solution as it returns to the storage tank. Because the centrifuge is frequently opened to load and unload castings, impurities may enter the centrifuge. The centrifuge process step lasts approximately five minutes. In the preferred embodiment, the rotation of the components is around a vertical axis.

As shown in item 128 in FIG. 6, the castings are then subject to a cleaning process. In the preferred embodiment, the baskets are transferred from the centrifuge to a dunk tank 130 containing deionized water at room temperature (FIG. 9). The basket containing the castings reciprocates in an up and down motion to remove sealer. In the preferred embodiment, air agitation is also added to the water. The basket is then placed in a second tank 132 and subjected to a static wash where jets of water are directed against the castings to further remove surface sealer. In the preferred embodiment, this overall cleaning step lasts for approximately four minutes. The baskets containing the castings are next transferred to a rotary wash tank 134. In the preferred embodiment, the baskets rotate about a horizontal axis for approximately four minutes in one direction and for approximately four minutes in the opposite direction. As shown in FIG. 9, the cleaning solutions from the dunk tank, static wash and rotary wash may be removed after one or more uses. The removed liquids should be properly treated before disposal, such as at 136. A main water supply 138 is connected to the dunk tank, static wash and rotary wash tanks. A deionizing station containing a mixed bed 140 may be optionally positioned on the supply line to treat the incoming water. A conductivity meter 142 may also be optionally placed on the supply line 144 to detect impurities.

At item 146 in FIG. 6, the castings are then subject to a curing step. More particularly, the castings are submersed in hot water bath 148 (FIG. 9). Preferably, the temperature is maintained between 87 and 93° C. for approximately ten minutes. The hot bath cures the sealer within the pores of the components. The water may also be supplied from the main supply source 138.

Next, the baskets containing the components are then placed in a vacuum dryer 150. Hot air is forced across the castings, further curing and drying the castings. In the preferred embodiment, the environment in the vacuum dryer is maintained at less than 40 millibars absolute pressure for approximately twenty minutes at about 45° C.

In step 152, an epoxy coating is applied to the castings. This is accomplished by first subjecting the casting to an acid wash and then an electronic deposition process. The acid wash comprises a cleaning cycle followed by subjecting the components to an acid bath. The acid bath prepares the surface to receive the epoxy. The types of acids used are phosphoric and nitric acid.

The deposition process preferably comprises electron deposition of the epoxy onto the surface of the castings.

The casting is then baked at a temperature of approximately 230° C. to cure the epoxy coating.

At step 154 in FIG. 6, the castings are then subjected to final machining to meet final dimensions. As part of the machining process, some epoxy and sealer is removed and/or additional pores may be partially exposed. Accordingly, at item 156, the process repeats steps 3 through 7. Thus, the castings are now twice impregnated with sealer.

The twice-impregnated castings are subjected to a final cleaning process at step 158. The cleaning process is similar to the internal cleaning process at step 104.

At step 160, the castings are subject to a final curing process. In the preferred embodiment, this includes baking the sealed casting for approximately two hours at 200° C. This process additionally cures the sealer as well as out gases impurities.

At step 162, the castings are subjected to a final cleaning and are then shipped for assembly into hard disk drives. The final cleaning process is similar to that at step 104.

To further help achieve desired sealability for the intended life of the disk drive, the preferred embodiment utilizes additional techniques. For example, as shown in FIGS. 1 and 3, to reduce porosity, ramps 72 under 2 millimeters high located on the bottom surface 22 of the base plate and on the bottom surface 48 of the cover should be 45° or have a full radius all around. Additionally, as shown in FIG. 5, areas less than 1 millimeter square should be preferably no less than 1 millimeter thick. If the surface area is greater than 1 millimeter square, the thickness should be equal or greater than 1.25 millimeters. Thus, the thickness of the base plate near one of the apertures 36 used to interconnect the cover to the base plate should have a minimum thickness "M" of no less than 1 millimeter. This is typical of all blind holes on the base plate. Similarly, the recessed area 50 in the cover should have a thickness of at least 1.25 millimeters. For larger areas, minimum thickness should be 1.5 millimeters. The minimum thickness and the 45° ramps help ensure porosity does not exceed minimum preferred levels.

In addition, the inventors have determined a metallic C-shaped seal between the top cover and base plate creates the best seal to inhibit gas leakage between the base plate and cover. In the preferred embodiment, the base plate perimeter and cover perimeter 34 and 38, respectively, must be equal to or better than 0.41 micrometers finish, 0.07 millimeter flatness and 0.001 millimeter change in flatness per square millimeter. To maintain this required flatness, two full ribs 74 are needed under the long ends of the base plate, and two wide thick platforms 76 under the short ends consistent with form factor space requirements. Similarly, the upper surface 34 of the cover perimeter wall 46 should be as flat as possible to optimize the seal between the cover and base plate.

Also, as shown, for example, at openings 24 and 42, special measures must be taken for potting connectors that feed through the base plate to prevent undesired leakage of the helium or inert gas. Such special features are the subject of co-pending U.S. patent application Ser. No. 10/839,606 entitled "Method for Controlled Fabrication of Hermetically Sealed PCB Connector".

The cover and base plate may further include two or more pins 80 for aligning the cover plate relative to the base plate and to minimize lateral movement of the cover relative to the base plate and C-shaped seal during assembly. Such lateral movement could otherwise create scratches which may enhance leakage.

Similarly, the holes 36 and counter bores 82 for attaching the cover to the base plate should be uniformly spaced to avoid distortion of the seal when the cover is attached to the base plate.

Figure 8:
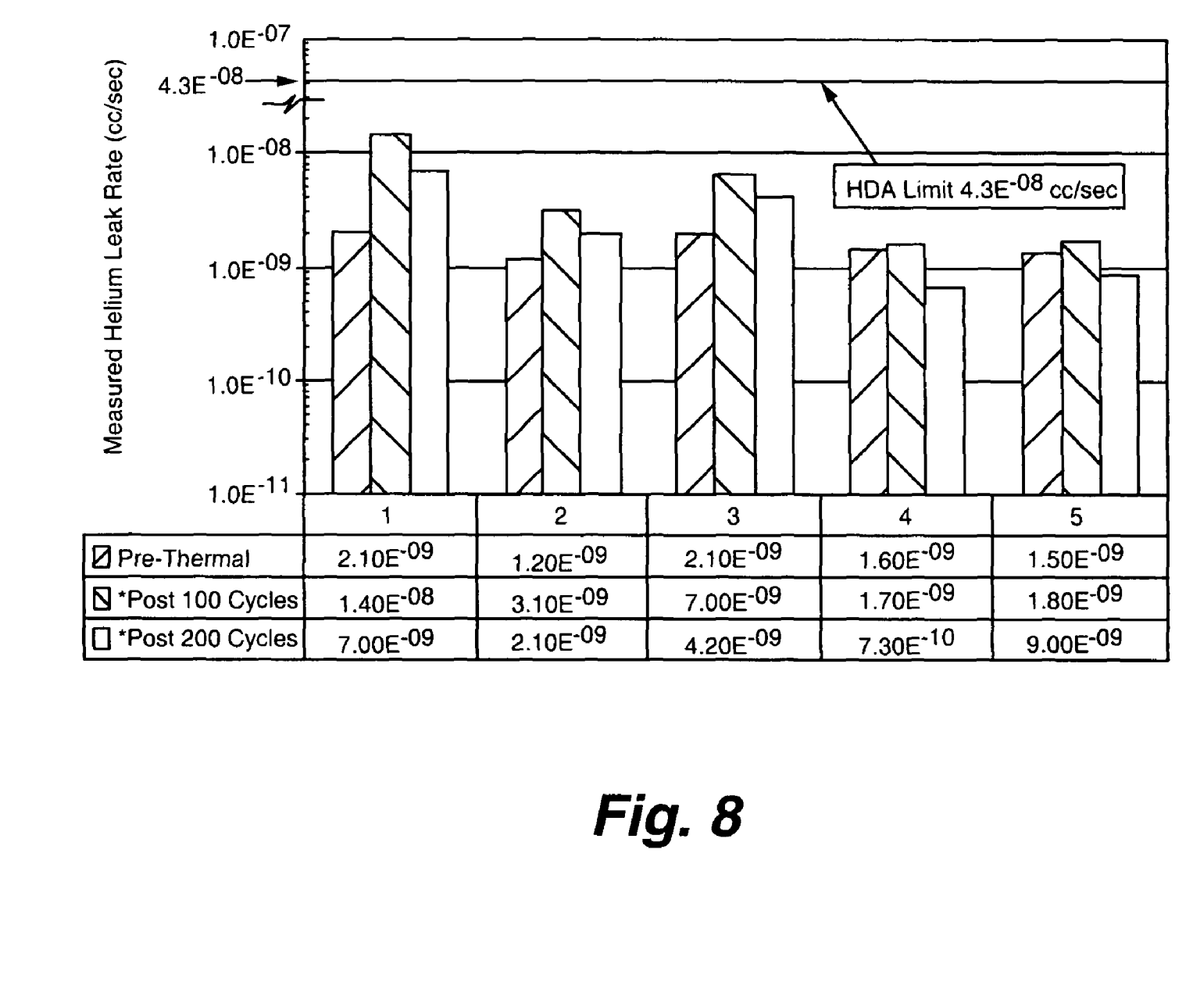
FIG. 8 is a graph showing test data taken from disk drive housings made from a process of the present invention.

It has been found based upon experimentation that sealing a base plate and cover along the lines described above will maintain helium at acceptable levels for at least a five-year period. FIG. 8 sets forth testing conducted on five disk drive housings and compares leakage of the drives before any thermal testing, following 100 cycles of thermal testing, and following 200 cycles of thermal testing. The castings were sealed with IMP 3000 Sealant from International Metal Impregnations GmbH. A thermal cycle subjects each drive to a temperature of −40° C. and then 100° C. One cycle consisted of maintaining the housings at −40° C. for two hours followed by maintaining the housings at 100° C. for two hours. It is determined that the acceptable leakage limit for a disk drive would be $4.3E^{-8}$ cubic centimeters per second which would permit no more than 5% of the initial helium environment to leak out of the disk drive over a period of five years.

Using that standard, the data in Table 8 shows that the disk drives sealed in accordance with the present invention will not leak an unacceptable amount of helium. More specifically, before subjecting the castings to any thermal cycles, each of the housings exhibited a leak rate of less than $1.00E^{-8}$ cubic centimeters per second. Similarly, following 100 cycles and 200 cycles, the housing continued to exhibit a leak rate less than $4.3E^{-8}$ cubic centimeters per second.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of making a housing for a storage device that will enclose an environment of low density gas, comprising:

placing a housing component of a data storage device in an environment of decreased pressure, wherein a first tank that is an autoclave is pressurized at a selected pressure while the first tank encloses the housing component, a second tank that is an autoclave is pressurized at substantially the same pressure as the first tank while the second tank is fluidically coupled to the first tank and encloses a sealant;

applying the sealant to a surface of the component when it is under decreased pressure by transferring the sealant from the second tank to the first tank;

applying a pressure of at least one atmosphere so that a portion of the sealant contactingly permeates voids in the housing component; and curing the sealant.

2. The method of claim 1, wherein placing the component in an environment of decreased pressure comprises placing the component in a vacuum.

3. The method of claim 1, wherein applying a sealant to the surface of the component comprises submersing the component in a liquid resin under decreased pressure.

4. The method of claim 3, wherein the placing step and applying a sealant step are performed in the same pressurized chamber.

5. The method of claim 4, wherein the pressurized chamber is an autoclave.

6. The method of claim 1, wherein the sealant is methacrylate.

7. The method of claim 1, wherein the component is formed of aluminum which is stress relieved prior to the applying a sealant step.

8. The method of claim 7, wherein the component is stress relieved by heating the component.

9. The method of claim 7, further comprising cleaning the component following relieving stress.

10. The method of claim 1, further comprising spinning the component in a centrifuge following application of the sealant.

11. The method of claim 1, wherein the sealant is exposed to an elevated temperature during the curing step.

12. The method of claim 1, wherein the sealant is an epoxy.

13. The method of claim 1, wherein the applying a sealant, applying pressure, and curing steps are sequentially repeated upon the housing component.

14. The method of claim 13, wherein a second application of sealant is under decreased pressure conditions.

15. The method of claim 13, further comprising machining the component between applications of sealant to the surface of the component.

16. A method of making a housing for a storage device that will enclose an environment of low density gas, comprising:

placing a housing component in an environment of decreased pressure;

applying a sealant to a surface of the component when it is under decreased pressure, wherein the sealant is applied via electron deposition process;

applying a pressure of at least one atmosphere so that a portion of the sealant contactingly permeates voids in the housing component; and curing the sealant;

wherein the placing step comprises sealing a pressurizable tank that encloses a housing component of a data storage device;

wherein the applying a sealant step comprises introducing a sealant to the tank; and wherein the method further comprises steps of:

unsealing the tank to facilitate removal of said sealant permeated housing component from the tank;

applying a polymer coating to the sealant permeated housing component; and curing the polymer.

17. The method of claim 16, in which the applying the sealant step is repeated at least once.

18. The method of claim 16, in which the housing component comprises aluminum.

19. The method of claim 16, in which the housing component is stress relieved prior to pressurizing the tank.

20. The method of claim 16, in which the tank is sealed creating an environment of decreased pressure.

21. The method of claim 16, in which the sealant is applied by creating a pressure differential between a first tank and a second tank.

22. The method of claim 21, in which the first tank is at a pressure greater than that of the second tank.

* * * * *